United States Patent
Itzkovitz et al.

(10) Patent No.: US 8,243,715 B2
(45) Date of Patent: Aug. 14, 2012

(54) DELIVERING SIP-BASED CALL SERVICES TO CIRCUIT-SWITCHED TERMINALS

(75) Inventors: Ayal Itzkovitz, Haifa (IL); Tzach Livyatan, Tel-Aviv (IL); Tal Zoller, Haifa (IL)

(73) Assignee: Oracle Israel Ltd., Petach Tikva (IL)

( * ) Notice: Subject to any disclaimer, the term of this patent is extended or adjusted under 35 U.S.C. 154(b) by 1497 days.

(21) Appl. No.: 11/433,955

(22) Filed: May 15, 2006

(65) Prior Publication Data

US 2007/0263599 A1    Nov. 15, 2007

(51) Int. Cl.
*H04L 12/66* (2006.01)

(52) U.S. Cl. ........ 370/352; 370/356; 370/259; 370/328; 370/353; 370/354; 455/445; 455/435.1; 455/437

(58) Field of Classification Search .......... 370/352–356; 455/445
See application file for complete search history.

(56) References Cited

U.S. PATENT DOCUMENTS

| | | |
|---|---|---|
| 5,566,235 A | 10/1996 | Hetz |
| 6,115,746 A | 9/2000 | Waters et al. |
| 6,226,373 B1 | 5/2001 | Zhu et al. |
| 6,333,931 B1 | 12/2001 | Lapier et al. |
| 6,366,658 B1 | 4/2002 | Bjornberg et al. |
| 6,418,205 B2 | 7/2002 | Capers et al. |
| 6,661,785 B1 | 12/2003 | Zhang et al. |
| 6,693,898 B1 * | 2/2004 | Su et al. ........................ 370/355 |
| 6,735,621 B1 * | 5/2004 | Yoakum et al. ............... 709/218 |
| 6,940,847 B1 | 9/2005 | Glitho et al. |
| 6,954,455 B1 * | 10/2005 | Al Hakim et al. ............ 370/352 |
| 6,963,583 B1 * | 11/2005 | Foti ............................... 370/467 |
| 6,967,972 B1 | 11/2005 | Volftsun et al. |
| 6,990,124 B1 | 1/2006 | Dalias et al. |
| 7,161,925 B2 | 1/2007 | Wallenjus et al. |
| 7,447,513 B2 | 11/2008 | Anttila et al. |
| 7,466,991 B2 | 12/2008 | Everson et al. |
| 7,496,111 B2 | 2/2009 | Itzkovitz et al. |
| 7,620,391 B2 | 11/2009 | Itzkovitz et al. |

(Continued)

FOREIGN PATENT DOCUMENTS

WO    WO 99/21345    4/1999

(Continued)

OTHER PUBLICATIONS

U.S. Appl. No. 60/645,024.

(Continued)

*Primary Examiner* — Asad M Nawaz
*Assistant Examiner* — Khaled Kassim
(74) *Attorney, Agent, or Firm* — Fliesler Meyer LLP

(57) ABSTRACT

A method for communication in a communication system includes predefining a plurality of service delivery modes having different signaling and media path configurations in circuit-switched and packet-switched networks. A request to place a call is accepted in the circuit-switched network, and a call service to be provided to the call by a service platform in the packet-switched network is identified responsively to the request.

A service delivery mode is selected from the plurality responsively to an attribute of the call indicated by the request. Signaling and media paths are established for the call via the circuit-switched and packet-switched networks in accordance with the signaling and media path configurations of the selected service delivery mode. The call service is provided from the service platform to the call using the established signaling and media paths.

25 Claims, 10 Drawing Sheets

U.S. PATENT DOCUMENTS

| | | | |
|---|---|---|---|
| 2001/0017483 | A1 | 8/2001 | Frohberg |
| 2003/0012183 | A1 | 1/2003 | Butler et al. |
| 2003/0031160 | A1* | 2/2003 | Gibson Ang et al. ......... 370/349 |
| 2003/0081754 | A1* | 5/2003 | Esparza et al. ........... 379/221.01 |
| 2003/0093563 | A1 | 5/2003 | Young et al. |
| 2003/0128694 | A1 | 7/2003 | Hundscheidt et al. |
| 2004/0006623 | A1 | 1/2004 | Gourddaud et al. |
| 2004/0176089 | A1 | 9/2004 | Sylvain |
| 2004/0204095 | A1 | 10/2004 | Cyr et al. |
| 2004/0219948 | A1 | 11/2004 | Jones et al. |
| 2004/0246990 | A1 | 12/2004 | Krishnamurthi et al. |
| 2005/0009520 | A1 | 1/2005 | Herrero et al. |
| 2006/0104306 | A1 | 5/2006 | Adamczyk et al. |
| 2006/0105766 | A1 | 5/2006 | Azada et al. |
| 2006/0229078 | A1 | 10/2006 | Itzkovitz et al. |
| 2006/0276193 | A1 | 12/2006 | Itzkovitz et al. |
| 2007/0238467 | A1* | 10/2007 | Buckley et al. ............... 455/445 |
| 2007/0280154 | A1 | 12/2007 | Gupta et al. |
| 2008/0259887 | A1* | 10/2008 | Naqvi ........................... 370/338 |
| 2009/0080382 | A1 | 3/2009 | Chen et al. |
| 2009/0154484 | A1* | 6/2009 | Reesor et al. ................. 370/419 |
| 2009/0316693 | A1* | 12/2009 | Itzkovitz et al. ............. 370/352 |
| 2010/0002606 | A1* | 1/2010 | Preis et al. .................... 370/259 |
| 2010/0041428 | A1 | 2/2010 | Chen et al. |

FOREIGN PATENT DOCUMENTS

| | | |
|---|---|---|
| WO | WO 00/42760 | 7/2000 |
| WO | WO 02/12976 | 2/2002 |
| WO | WO 2005084128 A2 * | 9/2005 |
| WO | 2006077587 A2 | 7/2006 |

OTHER PUBLICATIONS

Faynberg, et al, "The Development of the Wireless Intelligent Network (WIN) and Its Relation to the International Intelligent Network Standards", Bell Labs Technical Journal (Summer, 1997), pp. 57-80.
www.parlay.org.
Parlay APIs 2.1: Generic Call Control Service Interfaces, Jun. 2000.
Annex B of Standard EN 301 140-1 V1.3.4 (Jun. 1999) of the European Telecommunications Standards Institute (ETSI—Sophia Antipolis, France), entitled "Intelligent Network (IN); Intelligent Network Application Protocol (INAP); Capability Set 2 (CS2); Part 1: Protocol Specification".
"Technical Specification Group Services and System Aspects; IP Multimedia Subsystems (IMS); Stage 2 (Release 7)", 3GPP TS 23.228, version 7.2.0, Dec. 2005.
Rosenberg et al., RFC 3261, "SIP: Session Initiation Protocol", Jun. 2002.
Lucent Technologies Inc., "IP Multimedia Subsystem (IMS) Service Architecture" White Paper, USA, Feb. 2005.
U.S. Appl. No. 12/788,330 "Providing session-based services to event-based networks using partial information" filed on May 27, 2010.
U.S. Appl. No. 12/788,331 "Providing session-based services to event-based networks in multi-leg calls" filed on May 27, 2010.
U.S. Appl. No. 12/788,332 "Providing session-based service orchestration to event-based networks" filed on May 27, 2010.
U.S. Appl. No. 12/551,588 Official Action dated Jun. 14, 2010.
Zhu X et al., "IIN model: modification and case study", Computer Networks, Elsevier Science Publishers B.V., Amsterdam, NL, vol. 35, No. 5, Apr. 2001, pp. 507-519.
"Wireless telephony application specification", WAPWTA Version, Nov. 8, 1999, pp. 36-37.
Perdikeas M K et al., "Parlay-based service engineering in a converged internet-PSTN environment", Computer Networks, Elsevier Science Publishers B.V., Amsterdam, NL, vol. 35, No. 5, Apr. 2001, pp. 565-578.
European Patent Application No. 01958333 Official Action dated Jan. 2, 2008.
European Patent Application No. 01958333 Search Report dated Sep. 3, 2007.
International Application PCT/IL2001/000723 Search Report dated Jun. 21, 2002.
International Application PCT/IL2006/000079 Patentability Report dated Aug. 6, 2009.
International Application PCT/IL2006/000079 Search Report dated Jul. 1, 2008.
U.S. Appl. No. 10/344,291 Official Action dated Feb. 8, 2007.
U.S. Appl. No. 10/344,291 Official Action dated Jun. 12, 2008.
U.S. Appl. No. 10/344,291 Official Action dated Oct. 4, 2007.
U.S. Appl. No. 11/361,690 Official Action dated Jan. 9, 2009.
U.S. Appl. No. 11/361,690 Official Action dated Jun. 19, 2008.
U.S. Appl. No. 11/361,839 Advisory Action dated Jun. 11, 2009.
U.S. Appl. No. 11/361,839 Official Action dated Jun. 19, 2008.
U.S. Appl. No. 11/361,839 Official Action dated Mar. 31, 2009.
U.S. Appl. No. 11/362,273 Official Action dated Jun. 19, 2008.
U.S. Appl. No. 11/362,273 Official Action Mar. 6, 2009.
International Application PCT/IB2010/052356 Search report dated Nov. 29, 2010.
Kalmanek et al., "A Network-Based Architecture for Seamless Mobility Services", IEEE Communications Magazine, pp. 103-109, Jun. 2006.

* cited by examiner

INCOMING CALL WITH AUTO-ATTENDANT
SERVICE (IMS-CONTROLLED MODE)

INCOMING CALL WITH MULTI-RING SERVICE
(IMS-CONTROLLED MODE)

INCOMING CALL WITH AUTO-ATTENDANT SERVICE
(EARLY MEDIA MODE)

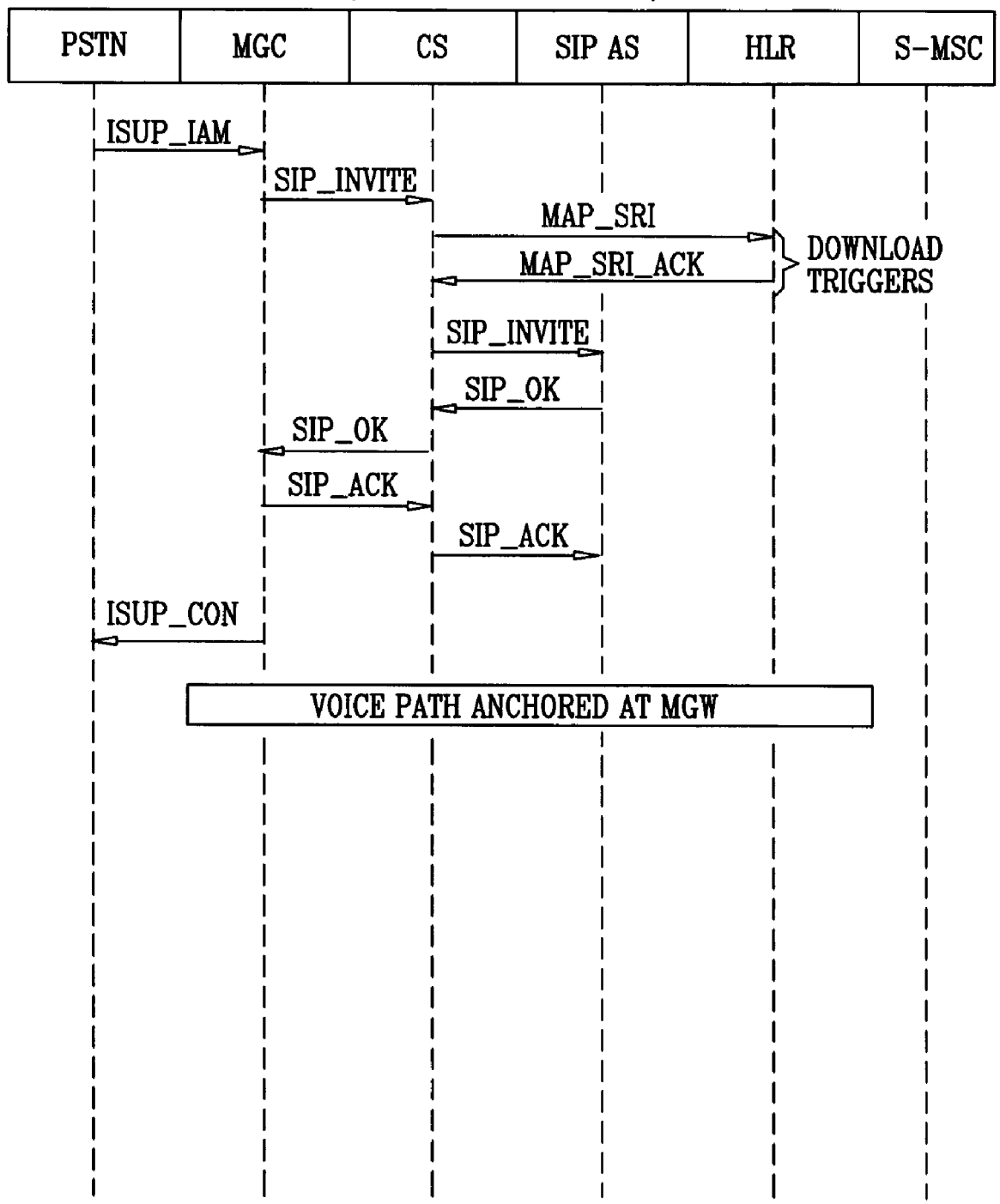

DELIVERING SIP-BASED CALL SERVICES TO CIRCUIT-SWITCHED TERMINALS

FIELD OF THE INVENTION

The present invention relates generally to communication networks, and particularly to methods and systems for providing packet network services to terminals in circuit-switched networks.

BACKGROUND OF THE INVENTION

Several concepts and architectures are known in the art for providing communication services over communication networks. For example, the Intelligent Network (IN) is an architectural concept that enables real-time execution of network services and customer applications in a distributed environment of interconnected computers and switching systems, such as wireline and wireless telephone networks. IN standards have been promulgated by the International Telecommunications Union (ITU-T) and by the American National Standards Institute (ANSI). The IN concept is described, for example, by Faynberg et al., in "The Development of the Wireless Intelligent Network (WIN) and Its Relation to the International Intelligent Network Standards," Bell Labs Technical Journal, Summer, 1997, pages 57-80, which is incorporated herein by reference.

Another example of a standardized service provisioning architecture is the Internet Protocol Multimedia Subsystem (IMS) architecture. The IMS architecture is defined and described in a $3^{rd}$ Generation Partnership Project (3GPP) standard entitled "Technical Specification Group Services and System Aspects; IP Multimedia Subsystem (IMS); Stage 2 (Release 7)," 3GPP TS 23.228, version 7.2.0, December 2005. This standard is available at www.3gpp.org/ftp/Specs/html-info/23228.htm. The IP multimedia core network (IM CN) subsystem enables Public Land-Mobile Network (PLMN) operators to offer their subscribers multimedia services based on and built upon Internet applications, services and protocols.

The IMS architecture is described, for example, in a whitepaper published by Lucent Technologies Inc. (Murray Hill, N.J.) entitled "IP Multimedia Subsystem (IMS) Service Architecture," February, 2005, which is incorporated herein by reference. The whitepaper is also available at www.lucent-.com/livelink/090094038005df2f_White_paper.pdf.

Signaling in IMS networks is typically performed in accordance with the well-known Session Initiation Protocol (SIP). SIP is described by Rosenberg et al., in request for comments (RFC) 3261 published by the Internet Engineering Task Force (IETF) entitled "SIP: Session Initiation Protocol," June 2002, which is incorporated herein by reference. This RFC is also available at www.ietf.org/rfc.

SUMMARY OF THE INVENTION

In some communication applications in which a circuit-switched network is connected to a packet-switched network, it is desirable to provide various different call services from service platforms of the packet-switched network to calls and terminals of the circuit-switched network. Embodiments of the present invention enable service providers to use packet network service platforms to provide diverse call services on circuit-switched networks with enhanced efficiency and versatility.

Call services may have different characteristics, which may affect the way in which the service provided on the circuit-switched network is handled by the service platform of the packet-switched network. For example, when providing the call service involves media interaction (i.e., processing related to the media content of the call) by the service platform, the media content of the call should be routed to the service platform, e.g., to a media server in the service platform. When the call service does not involve media interaction, the service platform may provide the service using signaling only, while the media content is handled within the circuit-switched network.

In disclosed embodiments of the present invention, a convergence server (CS) selects a service delivery mode for provision of call services of the packet-switched network to a call in the circuit-switched network, from among a set of predefined modes. As will be shown below, although the modes themselves are predefined, the mode selection is typically dynamic and may vary from one call to another and/or from one subscriber to another. Each delivery mode specifies a configuration of signaling and/or media paths to be used in providing the call services. The delivery modes may differ from one another in the functionality they provide, particularly with respect to the media interaction performed by the service platform at different stages of the call.

When a request to set up a call is received from a subscriber in the circuit-switched network, the CS, which is connected to both the circuit-switched and packet-switched networks, identifies a call service that should be provided to the call by a service platform in the packet-switched network. The convergence server selects one of the predefined service delivery modes based on attributes of the call. The convergence server sets up signaling and media paths for the call via the circuit-switched and packet-switched networks in accordance with the selected delivery mode. The service platform uses these paths in providing the call service.

Exemplary service delivery modes described herein comprise an IN mode in which the media path is confined to the circuit-switched network, an IMS-controlled mode enabling media interaction throughout the entire call, and an early media mode supporting media interaction in the initial stages of the call. The service delivery modes also differ from one another in the amount of computing and/or communication resources they draw from different network elements. As will be shown below, network resources can be used more efficiently by matching the service delivery mode to the characteristics of the call service.

There is therefore provided, in accordance with an embodiment of the present invention, a computer-implemented method for communication in a communication system that includes a circuit-switched network and a packet-switched network, the method including:

predefining a plurality of service delivery modes having different respective signaling and media path configurations in the circuit-switched and packet-switched networks;

accepting a request to place a call in the circuit-switched network;

responsively to the request, identifying a call service to be provided to the call by a service platform in the packet-switched network;

selecting a service delivery mode from the plurality responsively to an attribute of the call indicated by the request;

establishing signaling and media paths for the call via the circuit-switched and packet-switched networks in accordance with the respective signaling and media path configurations of the selected service delivery mode; and providing the call service from the service platform to the call using the established signaling and media paths.

In an embodiment, selecting the service delivery mode includes matching the selected mode to a need of the service platform to access a media content of the call in order to provide the call service.

In another embodiment, predefining the plurality of service delivery modes includes defining at least one of an intelligent network (IN) mode having a media path configuration confined to the circuit-switched network, an early media mode having an initial media path configuration connected to the service platform via the packet-switched network and a subsequent media path configuration confined to the circuit-switched network, and an IP Multimedia Subsystem (IMS)-controlled mode having a first media path configuration anchored at a media gateway (MGW) in the packet-switched network and a second media path configuration further extending the first media path configuration by connecting the MGW and the service platform.

In yet another embodiment, predefining the plurality of service delivery modes includes defining an intelligent network (IN) mode having a media path configuration confined to the circuit-switched network, and selecting the service delivery mode includes selecting the IN mode when providing the call service by the service platform does not depend on a media content of the call.

In still another embodiment, predefining the plurality of service delivery modes includes defining an early media mode having a first media path configuration connected to the service platform via the packet-switched network and a second media path configuration confined to the circuit-switched network. Selecting the service delivery mode may include selecting the early media mode when providing the call service by the service platform depends on a media content of the call only in an initial stage of the call. Additionally or alternatively, establishing the signaling and media paths includes establishing the first media path configuration in the initial stage of the call and switching to the second media path configuration responsively to a request by the service platform.

In an embodiment, predefining the plurality of service delivery modes includes defining an IP Multimedia Subsystem (IMS)-controlled mode having a first media path configuration anchored at a media gateway (MGW) in the packet-switched network and a second media path configuration further extending the first media path configuration by connecting the MGW and the service platform. Establishing the signaling and media paths may include switching from the first media path configuration to the second media path configuration so as to provide a media content of the call to the service platform. Additionally or alternatively, establishing the signaling and media paths may include alternating between the first and second media path configurations responsively to a request by the service platform.

In another embodiment, identifying the call service includes downloading a list of triggers identifying call services defined for the call from a service database.

In yet another embodiment, the attribute of the call includes at least one of a service identifier (service ID), an identity of a subscriber originating the call and an identity of a subscriber accepting the call.

In still another embodiment, the circuit-switched network includes an intelligent network (IN), the packet-switched network includes an Internet protocol Multimedia Subsystem (IMS) network, and the service platform includes a Session Initiation Protocol (SIP) Application Server (AS).

There is also provided, in accordance with an embodiment of the present invention, a convergence server, including:

first and second network interfaces, which are respectively arranged to communicate with a circuit-switched network and a packet-switched network; and a processor, which is arranged to accept a request to provide a call service by a service platform in the packet-switched network to a call in the circuit-switched network, to select a service delivery mode from a plurality of predefined service delivery modes having different respective signaling and media path configurations in the circuit-switched and packet-switched networks responsively to an attribute of the call indicated by the request, to establish signaling and media paths for the call via the circuit-switched and packet-switched networks in accordance with the respective signaling and media path configurations of the selected service delivery mode, and to invoke the service platform to provide the call service to the call using the established signaling and media paths.

There is additionally provided, in accordance with an embodiment of the present invention, a communication system, including:

a circuit-switched network;

a packet-switched network including a service platform, which is arranged to provide a call service; and a convergence server connected to the circuit-switched and packet-switched networks, which is arranged to accept a request to provide the call service by the service platform to a call in the circuit-switched network, to select a service delivery mode from a plurality of predefined service delivery modes having different respective signaling and media path configurations in the circuit-switched and packet-switched networks responsively to an attribute of the call indicated by the request, to establish signaling and media paths for the call via the circuit-switched and packet-switched networks in accordance with the respective signaling and media path configurations of the selected service delivery mode, and to invoke the service platform to provide the call service to the call using the established signaling and media paths.

There is further provided, in accordance with an embodiment of the present invention, a computer software product for communication in a communication system that includes a circuit-switched network and a packet-switched network, the product including a computer-readable medium, in which program instructions are stored, which instructions, when read by a computer, cause the computer to accept a request to provide a call service by a service platform in the packet-switched network to a call in the circuit-switched network, to select a service delivery mode from a plurality of predefined service delivery modes having different respective signaling and media path configurations in the circuit-switched and packet-switched networks responsively to an attribute of the call indicated by the request, to establish signaling and media paths for the call via the circuit-switched and packet-switched networks in accordance with the respective signaling and media path configurations of the selected service delivery mode, and to invoke the service platform to provide the call service to the call using the established signaling and media paths.

The present invention will be more fully understood from the following detailed description of the embodiments thereof, taken together with the drawings in which:

BRIEF DESCRIPTION OF THE DRAWINGS

FIGS. 7-11 are call flow diagrams that schematically illustrate methods for providing call services, in accordance with embodiments of the present invention.

DETAILED DESCRIPTION OF EMBODIMENTS
SYSTEM DESCRIPTION

Figure 1:
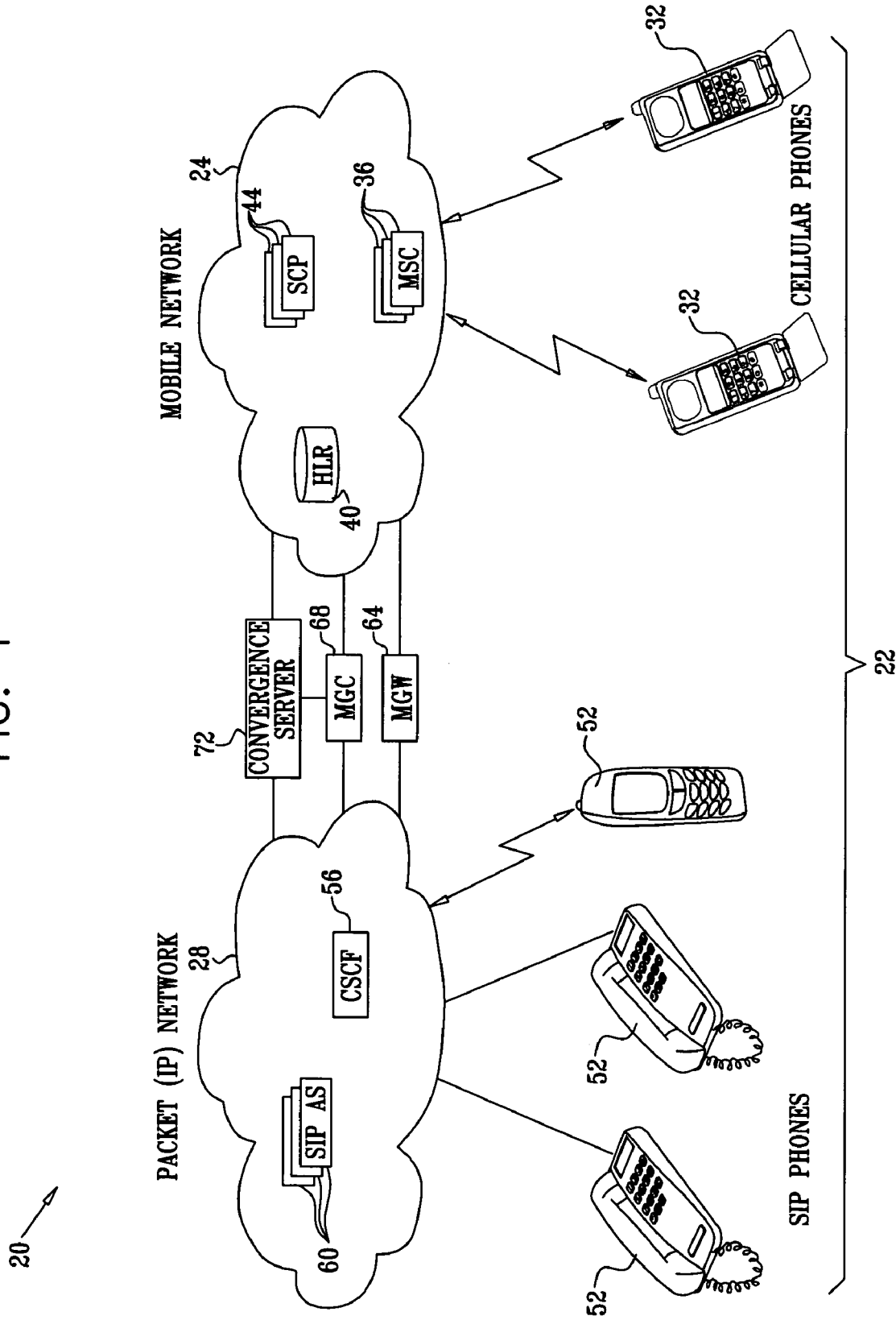
FIG. 1 is a block diagram that schematically illustrates a communication system, in accordance with an embodiment of the present invention.

FIG. 1 is a block diagram that schematically illustrates a communication system 20, in accordance with an embodiment of the present invention. System 20 comprises a circuit-switched mobile network 24 and a packet-switched network 28, which provide communication services to terminals 22. Circuit-switched network 24 provides connectivity and call services to circuit-switched 32, such as mobile terminals and public switched telephone network (PSTN} wireline telephones. Network 24 may comprise, for example, a Code Division Multiple Access (CDMA) cellular network such as a CdmaOne, Universal Mobile Telecommunication System (UMTS), CDMA2000 or EvDo network, a Global System for Mobile communication (GSM) cellular network, or any other suitable mobile network. Network 24 provides intelligent network (IN) services to terminals 32, in accordance with the IN standards cited above. The elements of network 24 are typically interconnected by a circuit-switched public land mobile network (PLMN) operating in accordance with the well-known signaling system 7 (SS7) protocol. In some embodiments, network 24 comprises a wireline, SS7-based network. In these embodiments, IN services are provided by network 24 in accordance with a variant of the IN standard, referred to as an advanced intelligent network (AIN).

Terminals 32 may comprise cellular phones, cellular or wireless modems and adapters, and/or any other suitable terminal type. For the sake of simplicity, the description that follows will refer mainly to cellular phones, although the methods and systems described herein can be used in conjunction with any other type of terminals or communication clients.

Packet-switched network 28 may comprise, for example, an Internet protocol (IP) network, a wireless local area network (WLAN), a Wi-Fi network, a WiMax Network, or any other packet-switched, wireless or wireline, communication network. In some embodiments, network 28 may comprise a packet network operating over a mobile infrastructure, such as a CDMA2000 EvDO network. In the present example, network 28 comprises an IP Multimedia Subsystem (IMS) network, in accordance with the IMS standards cited above. As such, network 28 operates in accordance with the session initiation protocol (SIP) described in RFC 3261, cited above. Network 28 provides connectivity and communication services to IP terminals 52 such as SIP phones, voice over IP (VoIP) phones, IP multimedia terminals and/or any other type of IP terminals. IP terminals 52 may comprise fixed IP terminals, mobile IP terminals, or both.

Terminals 32 conduct calls via network 24. Although the embodiments described herein refer mainly to voice calls, in the context of the present patent application and in the claims, the term "call" is used in a wider sense to describe any type of communication session with a terminal 32, such as, for example, voice calls, multimedia messaging service (MMS) messages and multimedia sessions.

Cellular phones 32 register with mobile switching centers (MSC) 36, typically via base stations and base station controllers (not shown), as is known in the art. In general, each phone 32 registers with a particular MSC at any given time. In some cases, a particular MSC may perform the function of a gateway MSC (GMSC) that accepts incoming calls from outside of network 24, as a serving MSC (S-MSC) serving a particular phone 32, or both. When network 24 comprises a wireline SS7-based network, other types of switching elements, such as C4/C5 switches, may be used instead of or in addition to MSC 36.

A home location register (HLR) 40 serves as the main terminal and subscriber database of network 24. HLR 40 stores subscriber and terminal information, such as the identities of the subscribers and terminals used in network 24. In some embodiments, HLR 40 may store access privileges, service parameters and any additional information related to the subscribers and/or terminals of the network.

In order to provide IN call services, network 24 comprises one or more service control points (SCP) 44. Generally, each SCP comprises a network element that receives triggers from an MSC or other network element and provides a particular communication service. IN services may comprise, for example, toll-free ("1-800") services, charging/billing services or prepaid services.

Network 28 comprises a call state control function (CSCF) 56. In accordance with the IMS architecture, CSCF 56 serves as a database that registers and authenticates SIP phones 52 and handles session control for these phones. In order to provide IMS services, network 28 comprises one or more SIP application servers (AS) 60, each providing a particular communication service. SIP AS 60 and SCP 44 are collectively referred to herein as service platforms. Each service platform may provide originating call services (services provided to the terminal initiating the call, also denoted O-side services) and/or terminating call services (services provided to the terminal accepting the call, referred to as T-side services).

Networks 24 and 28 are connected by one or more media gateways (MGW) 64 controlled by media gateway controllers (MGC) 68. Media gateways, as are known in the art, are located at the edge of a multi-service packet network and provide media translation between the protocols of disparate networks, such as between networks 24 and 28. For example, in the configuration of FIG. 1, MGW 64 translates the time division multiplexing (TDM) media formats of network 24 into IP-formatted media as required in network 28, and vice versa. MGC 68 provides translation of signaling and control protocols between the communication domains. In the example of FIG. 1, MGC 68 translates between the SS7 and SIP protocols used by networks 24 and 28, respectively.

In many practical cases, it is desirable to provide SIP-based IMS call services implemented in SIP AS 60 of packet-switched network 28 to terminals 32 of circuit-switched network 24. In some cases, for example, networks 24 and 28 are operated by the same service provider. When using previously-known network solutions, a service provider wishing to offer a particular service over a circuit-switched network and a packet network has to deploy separate SIP AS and SCP platforms, both running the same service. By contrast, the methods and systems described herein enable the provider to avoid duplicated service platforms. The provider can deploy a particular service using only a SIP AS 60, and use the AS to offer the service both to circuit-switched terminals 32 in network 24 and to SIP terminals 52 in network 28.

As another example, a service provider may be in the process of migrating from a legacy SS7-based IN network to a new generation IP-based IMS network. By providing SIP-based services to both networks, the service provider is able to invest in adding services and service platforms only in the new generation network. The provider can minimize further investments in the legacy network, while still offering every service of the new generation network to legacy network subscribers.

Providing SIP-based services to terminals 32 is performed by a convergence server (CS) 72, which is connected to networks 24 and 28 and to MGC 68. The internal structure of CS 72, as well as methods for providing SIP-based services to terminals 32 using CS 72, are described below. Some aspects of the internal structure of the CS and of providing services using the CS are described in PCT Patent Application PCT/IL2006/000079, filed Jan. 19, 2006, and in PCT Patent Publication WO 02/12976 A2. Both of these applications are assigned to the assignee of the present patent application and are incorporated herein by reference.

From the point of view of network 24, and in particular MSC 36, CS 72 appears and behaves like another SCP similar to SCP 44, which can be invoked using IN triggers to provide call services. As will be explained in detail below, when a MSC 36 is requested to invoke a service implemented in a SIP AS in network 28, the MSC invokes CS 72 in the same manner it invokes any other SCP 44. The CS then mediates between network 24 and elements of network 28 and sets up appropriate signaling and media paths in order to provide the desired call service by SIP AS 60.

CS 72 typically communicates with the different elements of system 20 using standard, well-known protocols. The CS may communicate with MGC 68 using protocols such as SIP or SIP for telephones (SIP-T) and with AS 60 using protocols such as SIP or IMS service control (ISC). The CS may communicate with HLR 40 using the SS7-based mobile application part (MAP) protocol, or using the IS-41 protocol commonly used in CDMA networks. The CS may communicate with SCP 44, MSC 36 (or other switches, e.g., wireline switches) using IN protocols such as the customized applications for mobile networks enhanced logic (CAMEL), wireless IN (WIN) protocols, CAMEL application part (CAP), IN application part (INAP) and AIN, as appropriate. Towards MSC 36, CS 72 appears as a SCP, capable of responding to IN triggers. Alternatively, CS 72 may use any other suitable protocols for communicating with elements of system 20.

Figure 2:
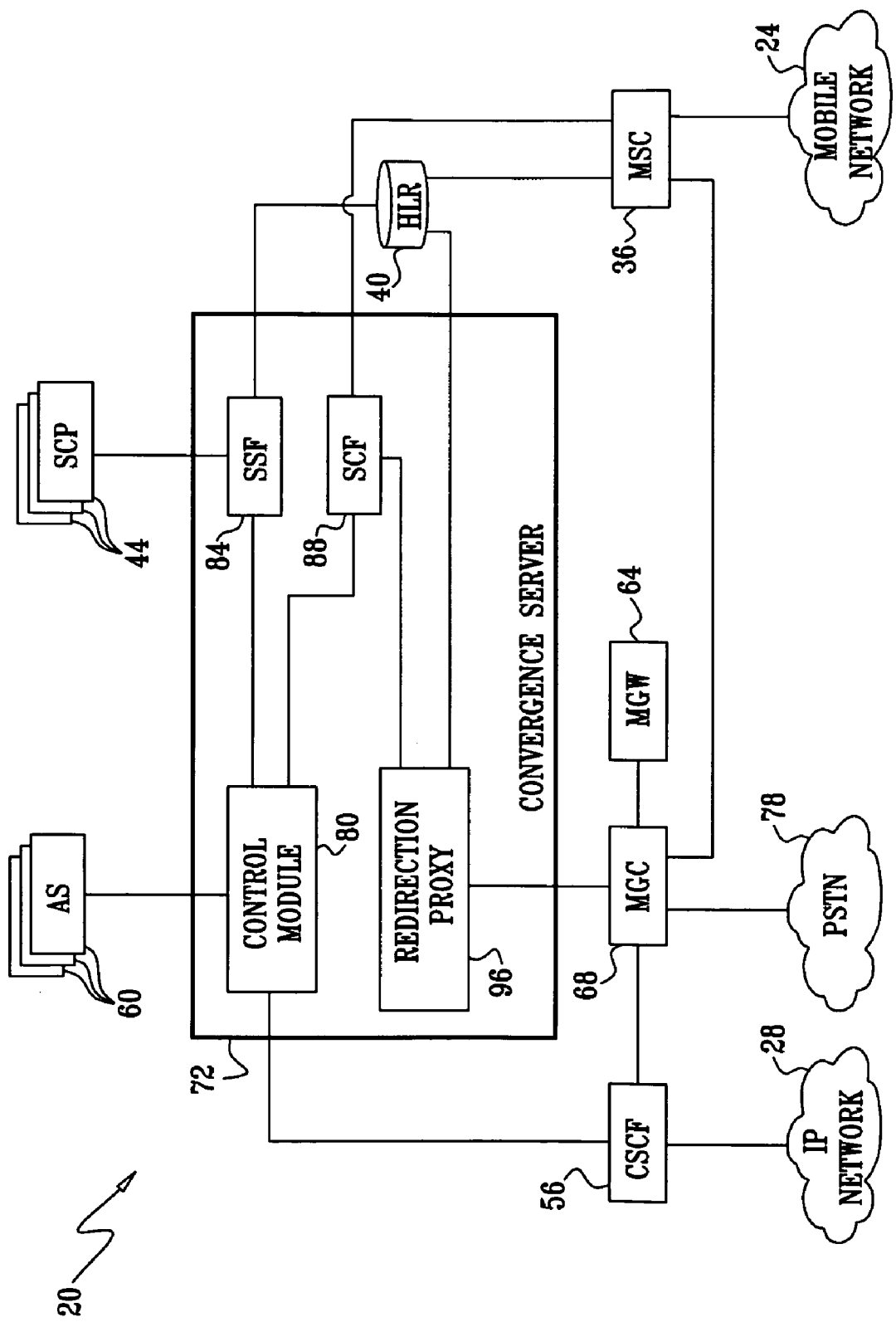
FIG. 2 is a block diagram that schematically illustrates elements of a convergence server, in accordance with an embodiment of the present invention.

FIG. 2 is a block diagram that schematically illustrates elements of CS 72 and their interaction with elements of system 20, in accordance with an embodiment of the present invention. In the system configuration of FIG. 2, MGC 68 is also connected to a public switched telephone network (PSTN) 78, from which incoming calls may arrive and to which outgoing calls may be destined. CS 72 comprises a control module 80, which performs the different management and coordination functions of the server. Module 80 also serves as a network interface for communicating with CSCF 56 and with SIP application servers 60 of network 28. In alternative embodiments, the functions of CSCF 56 may be integrated as part of CS 72 or MGC 68.

A service switching function (SSF) 84 serves as a network interface for communicating with SCPs 44 of network 24. SSF 84 functions similarly to an IP multimedia SSF (IM-SSF), as is known in IMS networks. The SSF produces triggers that invoke the different SCPs to provide the required services. In embodiments in which network 24 conforms to the IN architecture, SSF 84 communicates with SCPs 44 using INAP. SSF 84 also communicates with HLR 40. A service control function (SCF) 88 serves as an interface with MSCs 36 of network 24. As noted above, the SCF typically interacts with the MSCs similarly to a SCP. CS 72 comprises a redirection proxy 96, which stores contexts of calls processed by CS 72.

Typically, convergence server 72 comprises a general-purpose computer, which is programmed in software to carry out the functions described herein. The software may be downloaded to the CS in electronic form, over a network, for example, or it may alternatively be supplied to the computer on tangible media, such as CD-ROM.

Service Delivery Modes

Several service delivery modes are defined in system 20, and in particular in CS 72, for providing SIP-based call services to terminals 32 of network 24. The delivery modes differ from one another in the functionality they provide and in the signaling and control paths established through system 20. In particular, the service delivery modes differ from one another with respect to the extent of media interaction performed by AS 60 at different stages of the call. The term media interaction is used herein to describe any type of access to, modification of, or other action depending on media content associated with the call.

Figure 3:
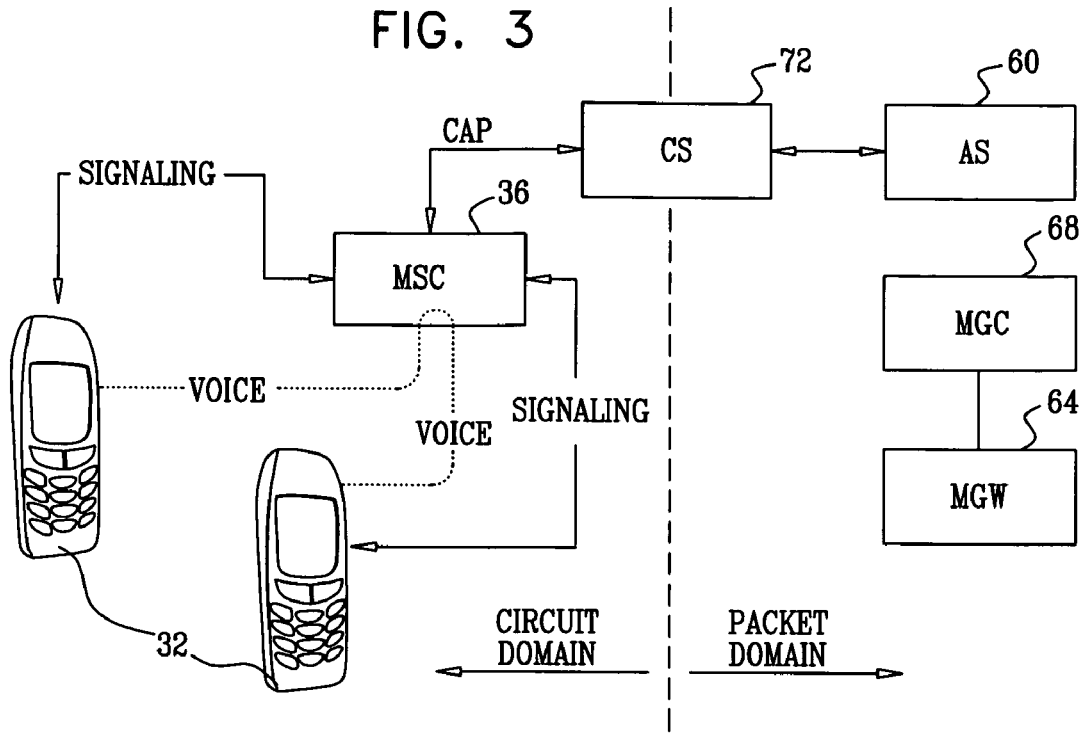
FIGS. 3-5 are block diagrams that schematically illustrate voice and signaling paths in a communication system, in accordance with embodiments of the present invention.
Figure 4:
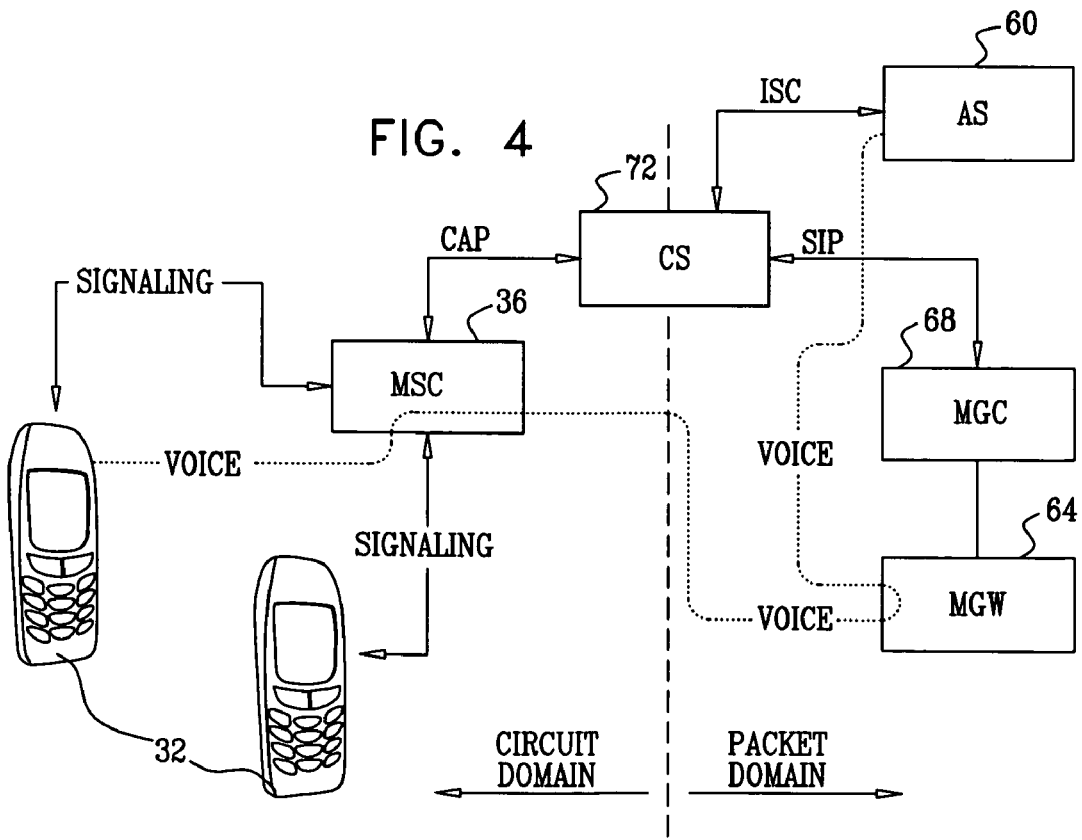
Figure 5:
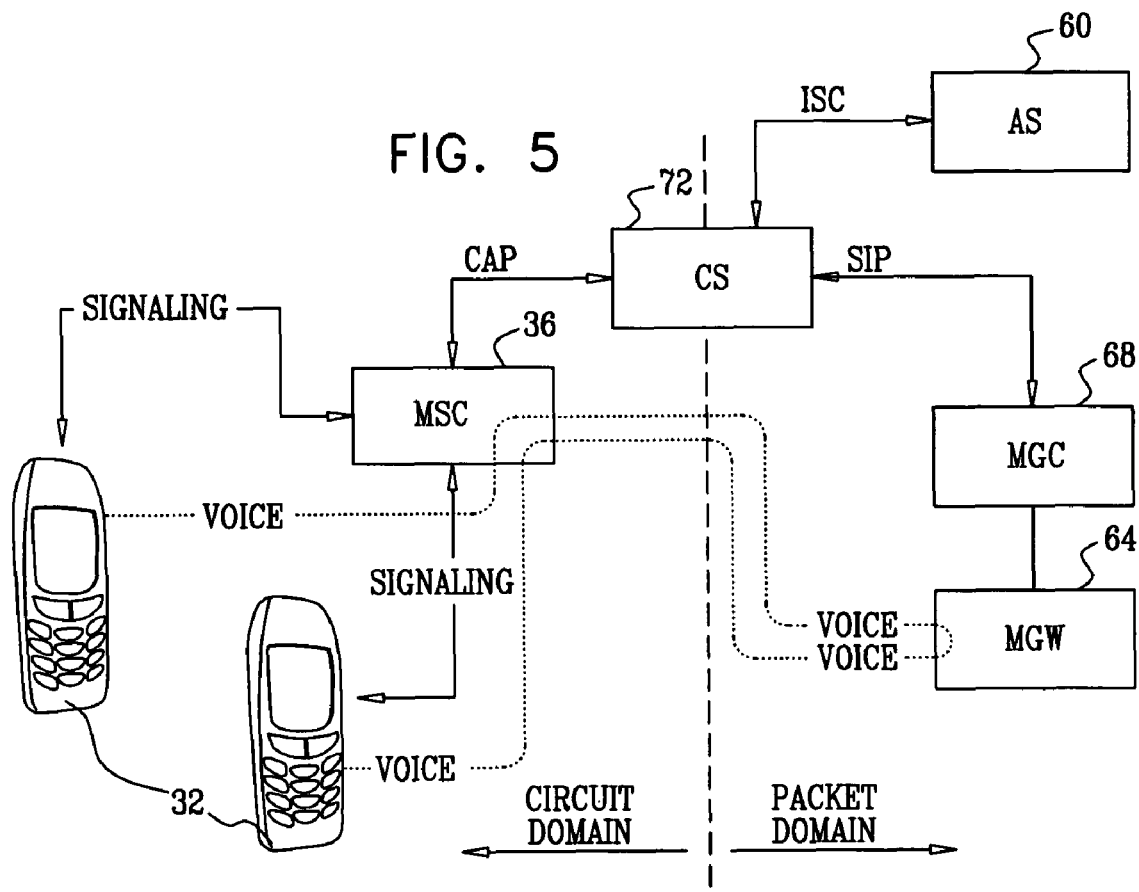

FIGS. 3-5 are block diagrams that schematically illustrate voice and signaling path configurations in system 20, in accordance with embodiments of the present invention. Although the description that follows refers mainly to voice media, the methods and configurations described herein can be used to provide services that involve any suitable media type, such as voice, images, video and rich multimedia content.

The voice and signaling path configurations are used as building blocks by different service delivery modes, as described further below. In FIGS. 3-5, system 20 is logically divided into a circuit domain comprising the elements of circuit-switched network 24, and a packet domain comprising the elements of packet network 28, MGW 64 and MGC 68. CS 72 mediates between the two domains.

In some embodiments, a particular call service can be provided by AS 60 to terminals 32 using only IN signaling messages, without accessing or influencing the media (e.g., voice content) of the call. Such media-less services may comprise, for example, virtual private network (VPN), toll-free ("1-800"), call screening and presence services. Media-less services can be provided using a voice path that remains within the circuit domain, with only signaling messages exchanged with AS 60 via CS 72. This delivery mode is referred to herein as an "IN mode."

FIG. 3 illustrates a configuration typical of media-less services. The figure shows a voice path of a particular call established between an originating terminal and a terminating terminal. The voice path is confined to the circuit domain, and only signaling messages are exchanged over the packet domain with AS 60. MSC 36 exchanges signaling messages with CS 72, which in turn communicates with AS 60. As can be seen in the figure, AS 60 has no access to the voice media.

In some embodiments, however, the service provided by AS 60 does involve media interaction. Services involving media interaction comprise, for example, conference, auto attendance and VPN with pre-call announcement services. In order to support such services, the voice media should be routed to the AS, in the initial stages of the call or whenever appropriate.

FIG. 4 illustrates a configuration in which a bidirectional voice path is established between the originating terminal and AS 60. The voice path passes through MSC 36 serving the originating terminal, via MGW 64, which performs media translation, to AS 60. The signaling path passes through the MSC to the CS. The CS exchanges signaling messages with MGC 68 and with AS 60.

Services that involve media interaction can be further classified to services in which media interaction is performed only during the initial stages of the call and services in which media interaction may be performed during the entire call. When a particular service involves media interaction only during the initial stages of the call, the service delivery mode may use the configuration of FIG. 4 in the initial call stages, and then revert to the configuration of FIG. 3 above during subsequent call stages. This delivery mode is referred to herein as an "early media mode."

If, on the other hand, the service provided by AS 60 may involve media interaction throughout the entire duration of the call, it is desirable to establish a media path that remains anchored in the packet domain throughout the call.

FIG. 5 illustrates a configuration in which the media is routed to and from the packet domain, passing through the MGW. Signaling messages are exchanged similarly to FIG. 4 above. Since the media path is anchored at MGW 64, CS 72 may instruct MGC 68 to route the media to AS 60 at any given time, thus enabling media interaction during the entire call. This delivery mode is referred to herein as an "IMS-controlled mode."

The system configurations of FIGS. 3-5 are simplified configurations in which some system elements were omitted from the figures for clarity. In alternative embodiments, for example, the originating and terminating terminals 32 may be served by different MSC. The packet domain may comprise any number of MGW, MGC and AS.

Service Delivery Method Description

Figure 6:
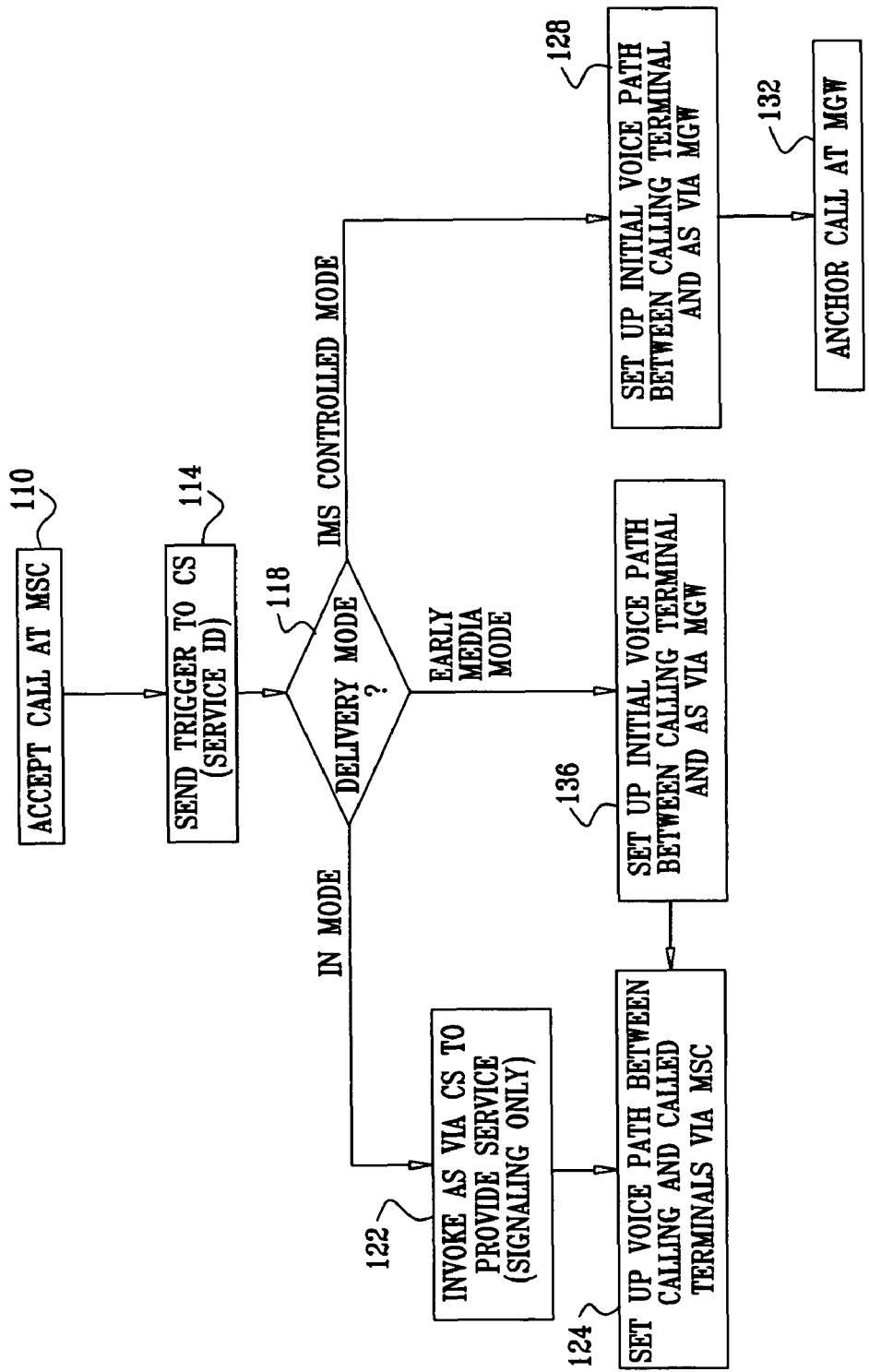
FIG. 6 is a flow chart that schematically illustrates a method for providing call services, in accordance with an embodiment of the present invention.

FIG. 6 is a flow chart that schematically illustrates a method for providing SIP-based call services to circuit-switched terminals, in accordance with an embodiment of the present invention. Additional exemplary call flows are shown in FIGS. 7-11 below. The method begins with one of MSC 36 of network 24 accepting a call, at a call acceptance step 110. The call is initiated by and/or destined to a terminal 32 in network 24. As noted above, in a wireline network, the functions of the MSC are carried out by a suitable wireline switch supporting wireline IN services.

In some embodiments, for example when the call is initiated by a terminal 32 of network 24, a list of services that should be provided to a given terminal 32 is pre-provisioned in HLR 40. For each service, the list comprises a service identifier (service ID) value. When a particular terminal 32 registers with an MSC, the MSC (acting as the S-MSC of this terminal) downloads the list of services defined for the terminal from the HLR, with the associated service ID values. In other cases, such as when the call comprises an external call accepted at an MSC serving as a gateway MSC (GMSC), the GMSC interrogates the HLR or other database to obtain the list of services. In IN terminology, the list of services comprises a list of IN triggers and the respective SCP designated to provide each service. For SIP-based services implemented by AS 60, the corresponding service definition in the HLR specifies CS 72 as the service platform that should be invoked for providing the service.

In alternative embodiments, the service ID values may be stored in any other suitable service database accessible to MSC 36. For example, some implementations of network 24 may not comprise an HLR. In the present context, HLR 40 is viewed as a service database holding service definitions and associated service ID values.

Further alternatively, the call may be handled by an IN-enabled switch without using any service database. In such embodiments, the list of triggers is typically statically predetermined in the switch.

For each SIP-based service defined for the call, the MSC sends an IN trigger to CS 72, at a triggering step 114. The IN trigger comprises the service ID value indicating the type of service to be provided.

CS 72 selects the service delivery mode that applies to the call responsively to the service ID in the IN trigger, at a mode selection step 118. The CS may apply any suitable logic or criteria for determining the service delivery mode. The selection logic may depend on the service ID value, the identity of the subscriber, the called number, the location (e.g., S-MSC, base station, base station controller or location server based coordinates) of the called or calling party, the date, the time of day and/or any other suitable attribute related to the call. The selection logic may also depend on an external policy server (not shown).

A call service can be associated with a particular delivery mode according to the functional flow of the service and/or the desired service experience. For example, if media interaction is known to be required only in the beginning of a call for a certain service, the service can be delivered using the early media mode. Alternatively, if the ability to change media is desirable throughout the call, the service may be delivered using the IMS-controlled mode. If media interaction is not required at all for the service, it can be delivered using the IN mode. The service delivery modes also differ from one another in the system resources they consume. The IN mode, for example, does not use any MGW resources and consumes less MSC resources in comparison to the IMS-controlled mode.

If CS 72 selects the IN mode at step 118 above, the CS invokes AS 60 to provide the service, at a media-less service invocation step 122. The CS exchanges signaling messages with MSC 36 and with AS 60 to provide the service. The MSC establishes a voice path between the originating and terminating terminals that is confined to the circuit domain of system 20, at a circuit domain voice path setting step 124. The voice and signaling configuration established for the call is similar to the configuration of FIG. 3 above. The media-less service delivery configuration of FIG. 3 is maintained for the entire duration of the call, during which AS 60 may continue to provide the SIP-based service using signaling only.

If, on the other hand, CS 72 selects the IMS-controlled mode at step 118 above, the CS sets up an initial voice path to the AS via MGW 64, at a voice path setting step 128. The initial voice path connects the originating terminal to the AS via the MGW, in accordance with the configuration of FIG. 4 above. This configuration is maintained during the initial stages of the call and thereafter, whenever media interaction is called for by the AS.

After the initial stage of the call, the CS sets up a voice path between the originating and terminating terminals that is anchored at the MGW, at an anchoring step 132. The CS anchors the call by exchanging signaling messages with MGC 68, which controls the MGW. The voice and signaling configuration established at step 132 is in accordance with the configuration of FIG. 5 above.

In some embodiments, CS 72 may switch to the configuration of FIG. 4 above whenever media interaction is required by AS 60, and switch again to the configuration of FIG. 5 above when media interaction is not required. Switching between the two configurations is performed by exchanging signaling messages with MGC 68. In some embodiments, AS 60 determines when to alternate between the two configurations depending on its need to access the voice content of the call.

Returning to step 132 above, if CS 72 selects the early media mode, the CS sets up an initial voice path via MGW 64, at an initial voice path setting step 136. Step 136 is similar to step 128 above, establishing a configuration such as shown in FIG. 4 above. During the initial stage of the call, the service functions provided by AS 60 may involve media interaction.

As noted above, in the early media mode media interaction is supported only in the initial call stages. Thus, after the initial stage of the call, after being instructed to do so by AS 60, CS 72 reverts to circuit domain voice path setting step 124 above. The CS typically instructs the MSC to establish a voice path that is confined to the circuit domain. The AS may continue to provide the SIP-based service in question using signaling only. In some embodiments, the AS may be unaware of the different service delivery modes. In these embodiments, CS 72 determines when AS 60 has completed the part of its service requiring media interaction.

The three service delivery modes described herein are exemplary modes. Additionally or alternatively, other delivery modes that define respective signaling and media path configurations can be defined. For example, a late media mode may begin with a voice path confined to the circuit mode and then establish a voice path to the AS towards the end of the call. This mode can be used, for example, to provide a calling card service, in which after completing a call the caller is transferred to a voice menu enabling him to make another call using the same calling card session.

Exemplary Call Flows

FIGS. 7-11 are call flow diagrams that schematically illustrate methods for providing call services, in accordance with embodiments of the present invention. In these examples, MSCs 36 in circuit-switched network 24 exchange signaling messages using the integrated services user part (ISUP) protocol, as defined in the SS7 standard. The MSCs communicate with CS 72 using CAP messages. The CS communicates with the elements of packet-switched network 28 using SIP messages.

Figure 7:
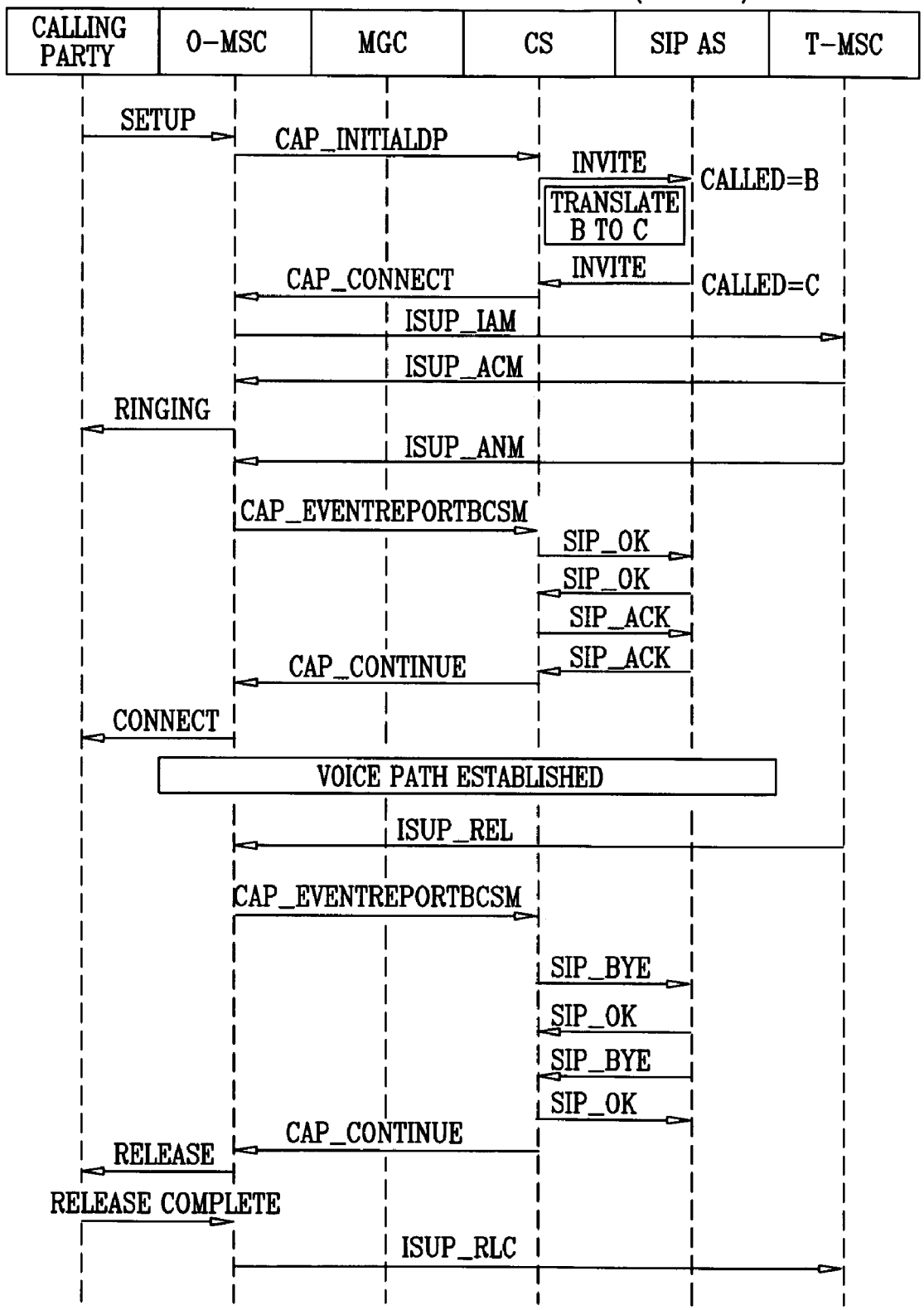

FIG. 7 is a call flow diagram showing an exemplary flow of providing a VPN shortened dialing service to an outgoing call. The call is initiated by a source terminal (referred to as a calling party) in network 24. The source terminal is served by an MSC referred to as an originating MSC (O-MSC), and the destination terminal is served by an MSC referred to as a terminating MSC (T-MSC). A VPN shortened dialing service is defined for the call, in which the user of the source terminal dials a shortened number denoted B instead of the full number of the called party, denoted C. The VPN service is provided by a SIP AS 60 in network 28. Since the shortened dialing service does not involve any media interaction by the AS, it is implemented using the IN mode, as defined above.

The source terminal initiates a SETUP request to the O-SMC, requesting to set up a call to called party C. The SETUP message carries the shortened number B. As described above, when the source terminal originally registered with network 24, a service list with the appropriate triggers was downloaded to the O-MSC. According to the list, the O-MSC is configured to invoke CS 72 to provide the service. The O-MSC invokes the CS using a CAP INITIALDP message, which carries a service ID that identifies the VPN service type.

CS 72 determines that the VPN service should be provided using the IN mode. In the flow that follows, the CS sets up the appropriate voice and signaling paths for the outgoing call, in accordance with the IN mode, so as to provide the VPN service to the call.

The CS sends a SIP INVITE message to SIP AS 60, which carries B as the called party. The AS then provides the call service by translating the shortened dialed number B to the full number C as the called party. Typically, AS 60 holds a list of shortened numbers and associated full telephone numbers. AS 60 returns an INVITE message to the CS, with C as the called party.

In some cases (not shown in the present call flow), SIP AS 60 may refuse to set up the call. For example, in some embodiments the AS may provide an additional call blocking service, which refuses some of the calls based on the called number. Such a service may be used, for example, to prevent certain terminals from initiating international calls. If the AS decides to refuse the INVITE message sent by the CS, the AS may respond to the CS with a SIP 401 message (or other SIP response such as a SIP 501 message) rather than with an INVITE. The CS acknowledges the refusal, and terminates the call by sending a CAP RELEASE message to the O-MSC. The O-MSC then terminates the call with the source terminal.

Assuming the call is approved and that the AS responded with an INVITE having C as the called party, the CS associates the received INVITE message with the previous INVITE sent to the AS, recognizing that the number of the called party was replaced. The CS thus sends to the O-MSC a CAP CONNECT message, instructing the O-MSC to continue setting up the call to the new number C. Typically, the CS also requests that the O-MSC continues to update the CS with the status of the call.

The O-MSC initiates a call to the T-MSC (the MSC serving the called party, or destination terminal) by sending an ISUP IAM message to the T-MSC. The T-MSC communicates with the destination terminal. The T-MSC sends an ISUP ACM message to the O-MSC, reporting that the destination terminal began ringing. The O-MSC reports this status to the source terminal. When the destination terminal answers the call, the T-MSC reports this status to the O-MSC using an ISUP ANM message. The O-MSC updates the CS with this status using a CAP EVENTREPORTBCSM message. The CS updates the SIP AS that the call was answered using a SIP OK message, which the AS acknowledges. As can be seen in the call flow, the signaling path between the CS and AS is established as two separate SIP calls, one call from the CS to the AS and one call in the opposite direction. The CS instructs the O-MSC to continue setting up the call with the calling party using a CAP CONTINUE message. The O-MSC sends a CONNECT message to the source terminal.

At this stage, a voice path is established between the source and destination terminals via the O-MSC and T-MSC. As explained above, the voice path in the IN mode is confined to circuit-switched network 24, and SIP AS 60 provides the call service using IN signaling only. The call continues using the established voice and signaling paths.

In the present example, it is now assumed that the called party disconnects the call. The T-MSC sends an ISUP REL message indicating the disconnection to the O-MSC. The O-MSC updates the CS with the disconnection status using a CAP EVENTREPORTBCSM message. The CS disconnects the signaling path to the AS using a SIP BYE message, which is acknowledged by the AS. As noted above, the signaling path to the AS was established as two unidirectional calls (CS-to-AS and AS-to-CS), therefore the AS disconnects the path from the AS to the CS using another SIP BYE message, which is acknowledged by the CS. The CS then disconnects the call with the O-MSC using a CAP CONTINUE message. The O-MSC in turn sends a RELEASE message to the source terminal. The source terminal acknowledges using a RELEASECOMPLETE message, and the disconnection is completed with the O-MSC sending an ISUP RLC acknowledgement to the T-MSC.

Figure 8:
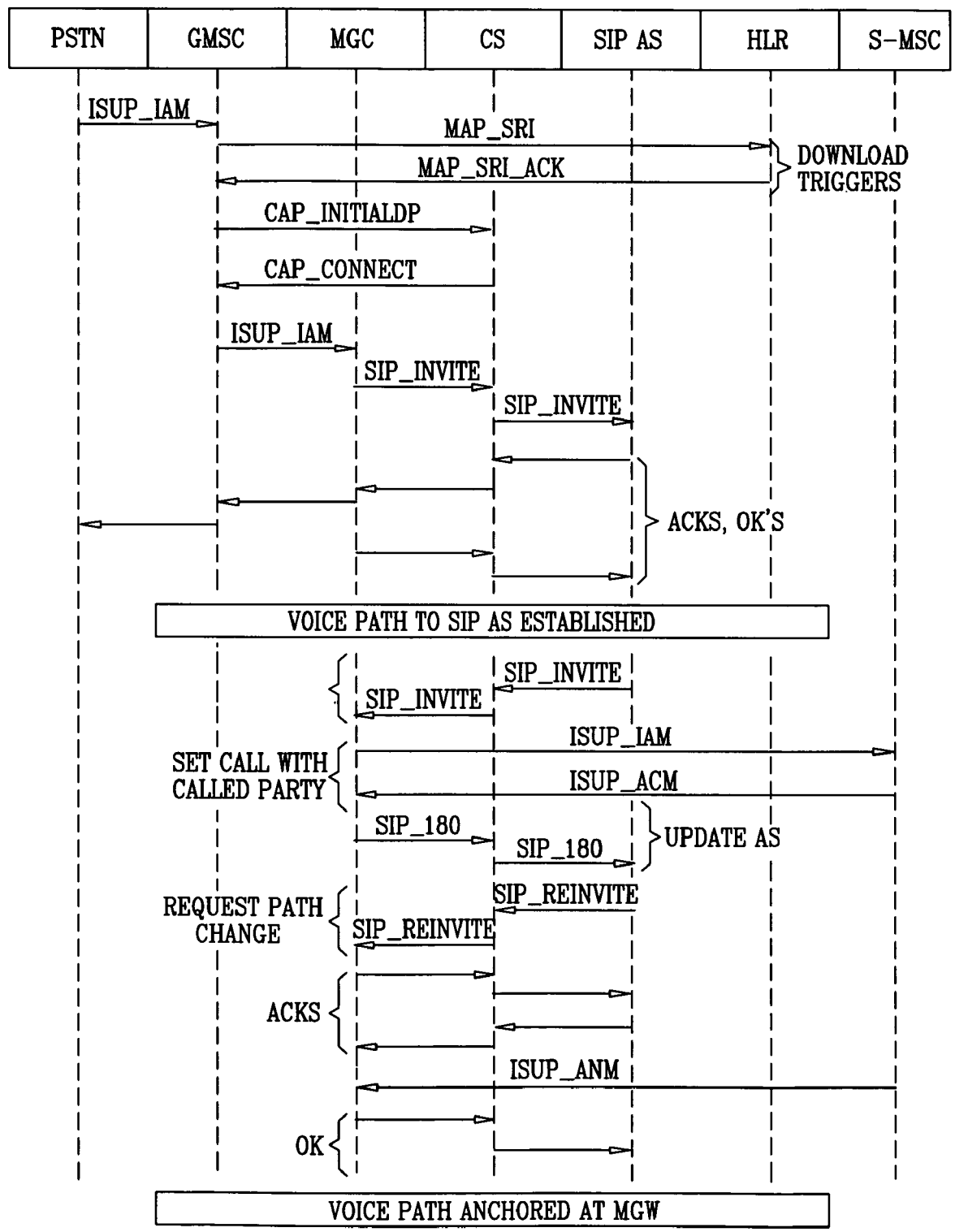

FIG. 8 is a call flow diagram showing an exemplary flow of providing an auto-attendant call service to an incoming call. In the present example, the call is an external call originating from PSTN 78 and accepted by one of MSC 36 serving as a gateway MSC (GMSC).

Unlike the previous examples, in the case of an external call the calling party is not pre-registered with any MSC in network 24, and the GMSC does not have the list of services and triggers defined for the call. Thus, after accepting a ISUP IAM request, the GMSC sends a MAP SRI message to HLR 40, requesting t download the trigger list defined for the call. The HLR provides the trigger list using a MAP SRI ACK message.

The following description assumes that the trigger list defines for the incoming call an auto-attendant call service implemented in a SIP AS 60 in network 28. As noted above, an auto-attendant service may involve media interaction during the entire call and is therefore typically provided using the IMS-controlled delivery mode.

The GMSC sends a CAP INITIALDP message carrying the appropriate service ID to CS 72, invoking it to provide the service. The INITIALDP message has B (the calling party specified in the IUSP IAM message accepted at the GMSC) as the calling party. The CS recognizes, based on the service ID, that the IMS-controlled mode should be used, and instructs the GMSC to forward the call to the CS. In some embodiments, the CS allocates a temporary routable number (TRN) associated with the CS and sends this number to the GMSC in a CAP CONNECT message. The GMSC forwards the call to the CS via MGC 68, using the provided TRN. The CS associates the call forwarded by the GMSC with the previous CAP INITIALDP message, and re-introduces the called party number B into the call.

The CS sends a SIP INVITE message to the AS, with B as the called party. The INVITE message indicates to the AS a network location in network 28 from which the voice content of the call can be read, typically an MGW 64. The AS, CS, MGC and GMSC acknowledge the setting up of the voice path. At this stage, a voice path is established between the calling party and the AS via the GMSC and MGW, such as in the configuration of FIG. 4 above. The SIP AS now provides the auto-attendant service to the calling party. Since the voice path reaches the AS, the service may involve media interaction.

In some embodiments, providing the service comprises accepting instructions from the calling party and/or navigating through voice menus, such as using dual-tone multi-frequency (DTMF) tones. The DTMF messages originating from the calling party are translated by the MGC to SIP INFO messages, which are forwarded to the AS via the CS. Alternatively, the DTMF entries can also be sent from the GMSC to the AS using the voice path itself.

When the AS concludes providing the auto-attendant service, it initiates a process of releasing the voice path (see the REINVITE messages below) and establishing a voice path between the calling and called parties anchored at the MGW. The AS sends an INVITE message to the MGC via the CS, with B as the called party. The MGC sends an ISUP IAM message to the S-MSC serving the called party, requesting to set up a call with the called party B. Once the called party terminal starts ringing, the S-MSC responds with an ISUP ACM message. The MGC reports this status to the AS, via the CS, using SIP 180 messages. The CS requests the MGC to change the voice path by sending SIP REINVITE messages via the CS. When the called party answers the call, the S-MSC sends an ISUP ANM message to the MGC.

At this stage, a voice path is established between the calling and called parties. The voice path passes through the GMSC and S-MSC, and is anchored at the MGW, as shown in FIG. 5 above. The signaling path to the AS is kept active. The AS may thus continue to provide services during the entire call. Since the voice path reaches the MGW, the AS may request the MGC to reroute the voice path to the AS whenever media interaction is desired for providing the service. When either party terminates the call, the termination is coordinated and reported among the S-MSC, GMSC, CS, MGC and AS, so as to terminate the voice and signaling paths to the AS and between the calling and called parties.

Figure 9:
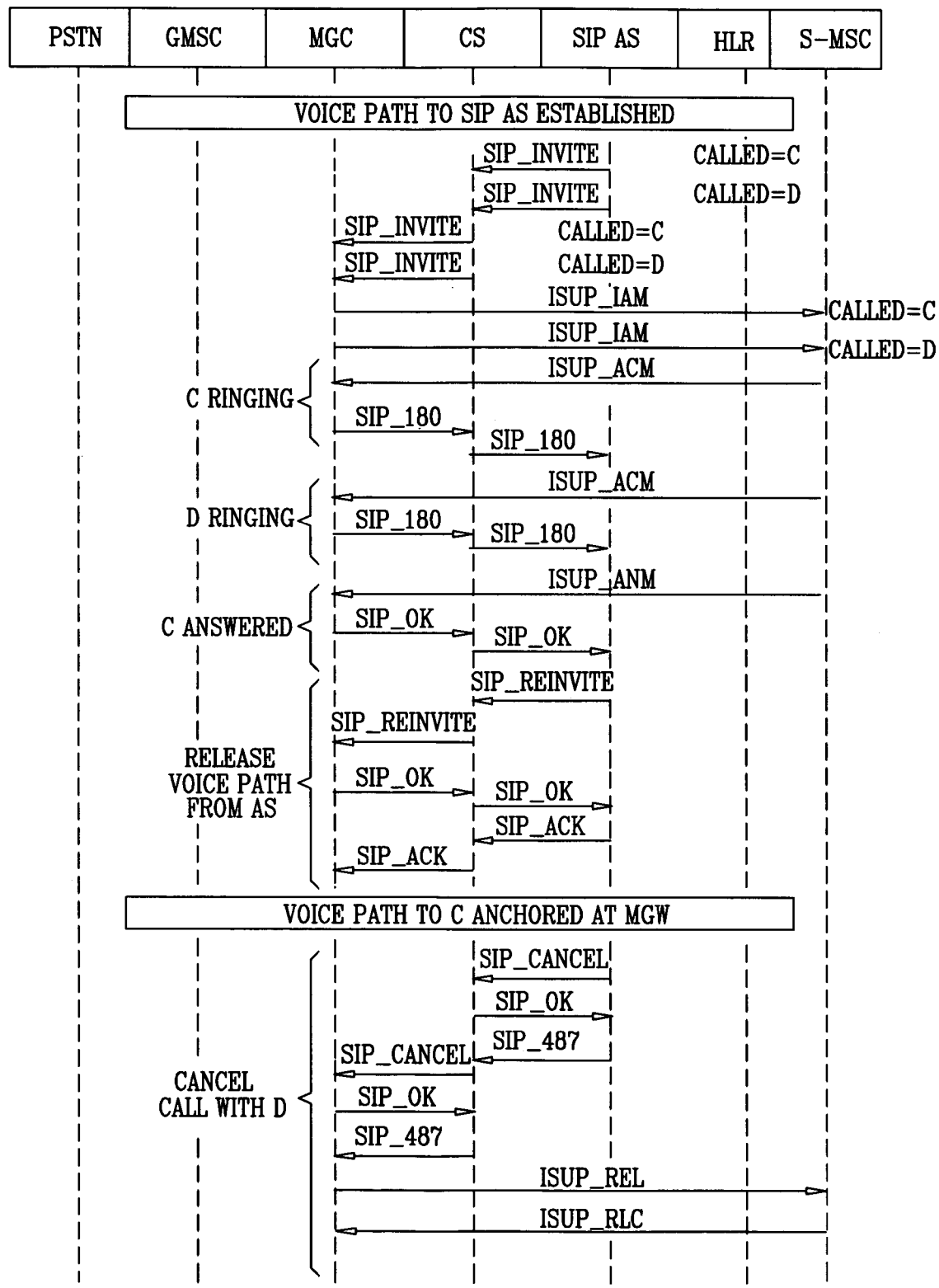

FIG. 9 is a call flow diagram showing an exemplary flow of providing a multi-ring call service to an incoming call, using the IMS-controlled mode. In the present example, a SIP AS provides a service in which two destination terminals 32 are called in parallel in response to the incoming call. A voice call is set up with the first terminal to answer. (Note that the multi-ring service does not involve media interaction. As such, it is possible in principle to provide this service using the IN mode. However, providing multi-ring using the IN-mode would require more advanced capabilities from the MSC. Thus, the service was chosen to be provided in the present example using the IMS-controlled mode.)

The method begins similarly to the description of FIG. 8 above, until the stage in which a voice path is established between the called party and the AS, as shown in FIG. 4 above. The AS sends two parallel INVITE messages, corresponding to the two called terminals, denoted C and D. The INVITE messages are sent to the MGC via the CS. The MGC translates these SIP messages to two respective ISUP IAM messages, sent to the S-MSC. The ISUP IAM messages have C and D as the called parties. (In the present example both called terminals are served by the same S-MSC. In alternative embodiments, the called terminals may be served by different S-MSCs. One or both called terminals may comprise a SIP terminal 52 in network 28.)

When each of the called terminals begins to ring, the S-MSC sends an ISUP ACM message, which is translated by the MGC to a SIP 180 message sent to the AS via the CS. Assuming terminal C answers, the S-MSC sends an appropriate ISUP ANM message to the MGC. The MGC reports to the AS that terminal C answered using a SIP OK message sent via the CS. Similarly to the process described in FIG. 8 above, the AS releases the voice path, and the MGC establishes a voice path between the calling party and called terminal C, anchored at the MGW, as shown in FIG. 5 above. The call between AS 60 and the other called terminal D is then cancelled, and the cancellation coordinated and reported to the CS, MGW, S-MSC and GMSC. When the call between terminal C and the calling party terminates, the termination procedure is similarly coordinated, as described above.

Figure 10:
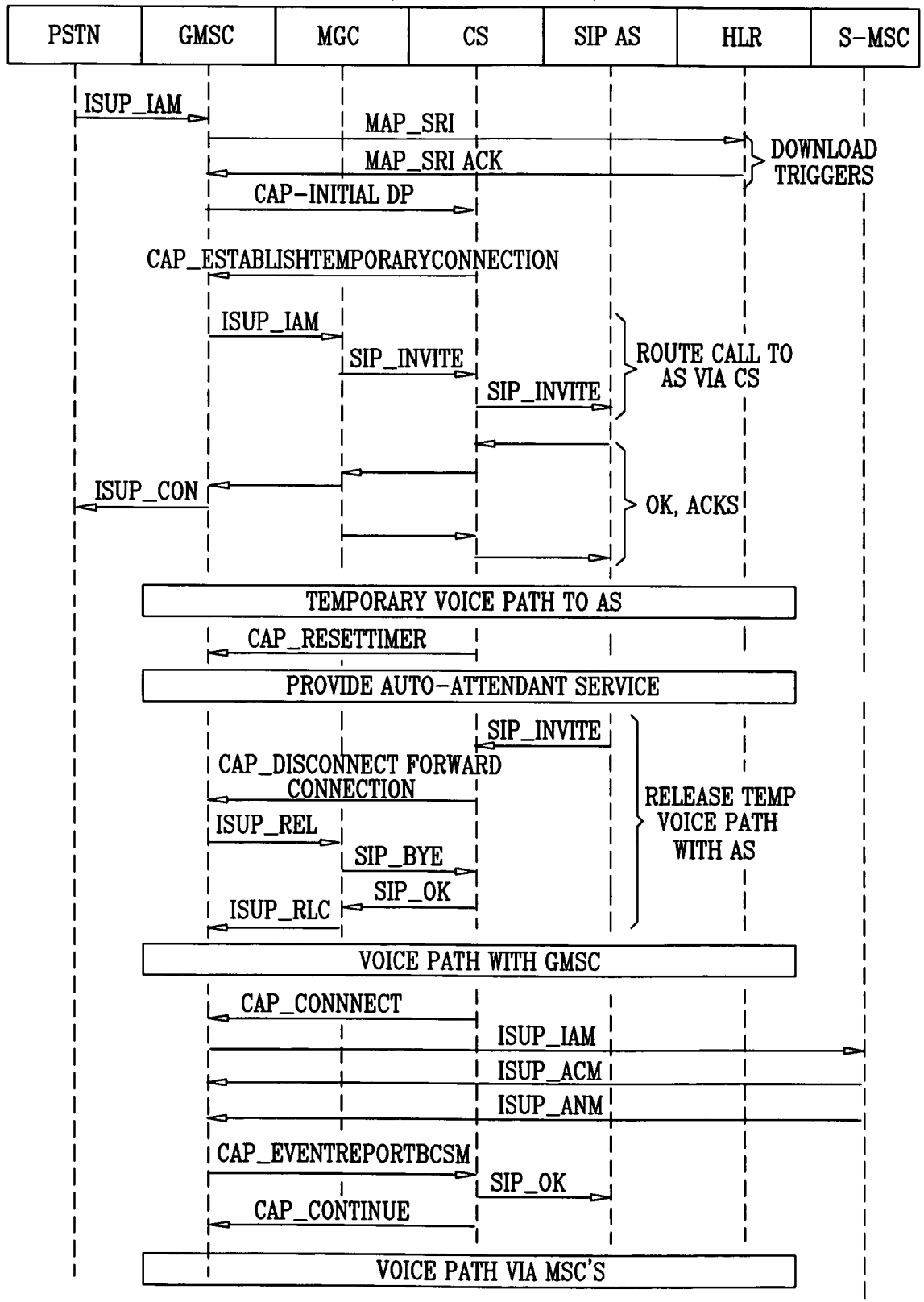

FIG. 10 is a call flow diagram showing an exemplary flow of providing an auto-attendant call service to an incoming call using the early media mode. The method begins similarly to the method of FIG. 8 above, until the stage in which the GMSC that accepts the call sends a CAP INITIALDP message to the CS.

The CS recognizes using the service ID that the early media mode should be used for providing the service. Therefore, instead of setting up a permanent voice path to the AS, the CS establishes a temporary connection. The CS sends a CAP ESTABLISHTEMPORARY CONNECTION message to the G-MSC. The connection is established using a temporary routable number (TRN), similarly to the method used in FIG. 8 above. The GMSC routes the call via the MGC and CS to the AS. At this stage, a temporary voice path is established between the called party and the AS, via the MGW, as shown in FIG. 4 above.

Since the connection with the AS is temporary, the CS periodically sends a CAP RESETTIMER message to the GMSC, indicating that the temporary connection is to be maintained. The AS can now provide the auto-attendant service to the calling party. When the AS completes providing the service, it sends a SIP INVITE message to the CS indicating that the temporary voice path can be released. The CS sends a CAP DISCONNECTFORWARDCONNECTION message to the GMSC, which releases the temporary connection by sending an ISUP REL message to the MGC, which translates it to a SIP BYE message sent to the AS.

At this stage, the voice path from the calling party reaches only as far as the GMSC. The CS now continues to form a voice path confined to the circuit domain, such as shown in FIG. 3 above. The voice path is established similarly to the process described in FIG. 7 above. The method ends with a voice path being set up between the calling and called parties, via the GMSC and S-MSC.

FIG. 11 is a call flow diagram showing another exemplary flow of providing a call service to an external incoming call using the IMS-controlled mode. In some embodiments, system 20 may be configured so that a call may arrive directly to MGC 68. In these embodiments, CS 72 assumes some of the functions of the GMSC. These configurations are referred to as "distributed GMSC configurations" and are described in greater detail in PCT Patent Application PCT/IL2006/000079 cited above.

The method begins with an ISUP IAM message arriving from the calling party, typically over PSTN 78, to MGC 68. The MGC sends a SIP INVITE to the CS. Since the CS in this case functions as a GMSC, the CS downloads the IN trigger list from HLR 40 (or other database) using MAP SRI and MAP SRI ACK messages. The CS then sends a SIP INVITE message to the AS, which acknowledges the message. The CS and MGC continue to set up a voice path to the AS via the MGW. From this point, the process continues in accordance with the IMS-controlled mode, with the CS performing the functions of the GMSC.

Although the embodiments described herein mainly address providing Internet Protocol Multimedia Subsystem (IMS) SIP-based services to terminals of Intelligent Network (IN) networks, the methods and systems described herein can also be used for providing any other session-based services over any suitable transaction-based communication layer. In the embodiments described herein, the session-based services comprise SIP services and the transaction-based communication layer comprises IN messaging. In other applications, the session-based services may comprise, for example, bearer-independent call control (BICC) or ISUP-based services. The transaction-based communication layer may comprise, for example, the SIP SUBSCRIBE/NOTIFY mechanism, common object request broker architecture (CORBA) events, etc.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A computer-implemented method for communication in a communication system that includes a circuit-switched network and a packet-switched network, the method comprising:
   providing a convergence server which connects the circuit-switched and packet-switched networks;
   predefining, in the convergence server, a plurality of service delivery modes having different respective signaling and media path configurations in the circuit-switched and packet-switched networks;
   deploying one or more call services over both the circuit-switched network and the packet switched network using a service platform;
   accepting a request from a calling terminal to place a call in the circuit-switched network;
   determining a list of call services that can be provided to the calling terminal;
   responsively to the request, for each service defined for the call, sending a trigger to the convergence server, wherein each trigger comprises a service identifier (service ID) indicating the type of service to be provided;
   selecting a service delivery mode, by the convergence server, from the plurality of service delivery modes, based on the service ID;
   establishing signaling and media paths for the call via the circuit-switched and packet-switched networks in accordance with the respective signaling and media path configurations of the selected service delivery mode, wherein in an
      intelligent network (IN) mode the convergence server invokes an SIP application server to provide each service defined in the call and establishes a media path between the calling terminal and a called terminal in the circuit-switched network,
      IP multimedia subsystem (IMS)-controlled mode the convergence server establishes an initial media path connecting the calling terminal to the SIP application server and then establishes a subsequent media path between the calling terminal and the called terminal using a media gateway (MGW), and
      early media mode the convergence server establishes an initial media path connecting the calling terminal to the SIP application server via the media gateway and then establishes a subsequent media path between the calling terminal and the called terminal in the circuit-switched network; and
   providing the services defined for the call from the service platform to the call using the established signaling and media paths.

2. The method according to claim 1, wherein selecting the service delivery mode comprises matching the selected mode to a need of the service platform to access a media content of the call in order to provide the particular call service.

3. The method according to claim 1, wherein predefining the plurality of service delivery modes comprises defining the intelligent network (IN) mode having a media path configuration confined to the circuit-switched network, and wherein selecting the service delivery mode comprises selecting the IN mode when providing the particular call service by the service platform does not depend on a media content of the call.

4. The method according to claim 1, wherein predefining the plurality of service delivery modes comprises defining the early media mode having a first media path configuration connected to the service platform via the packet-switched network and a second media path configuration confined to the circuit-switched network.

5. The method according to claim 4, wherein selecting the service delivery mode comprises selecting the early media mode when providing the particular call service by the service platform depends on a media content of the call only in an initial stage of the call.

6. The method according to claim 5, wherein establishing the signaling and media paths comprises establishing the first media path configuration in the initial stage of the call and switching to the second media path configuration responsively to a request by the service platform.

7. The method according to claim 1, wherein predefining the plurality of service delivery modes comprises defining the IP Multimedia Subsystem (IMS)-controlled mode having a first media path configuration anchored at the media gateway (MGW) in the packet-switched network and a second media path configuration further extending the first media path configuration by connecting the MGW and the service platform.

8. The method according to claim 7, wherein establishing the signaling and media paths comprises switching from the first media path configuration to the second media path configuration so as to provide a media content of the call to the service platform.

9. The method according to claim 7, wherein establishing the signaling and media paths comprises alternating between the first and second media path configurations responsively to a request by the service platform.

10. The method according to claim 1, wherein identifying the particular call service comprises downloading a list of triggers identifying call services defined for the call from a service database.

11. The method according to claim 1, wherein the service delivery mode can further be selected based on at least one of an identity of the calling terminal and an identity of a subscriber accepting the call.

12. The method according to claim 1, wherein the circuit-switched network comprises an intelligent network (IN), wherein the packet-switched network comprises an Internet protocol Multimedia Subsystem (IMS) network, and wherein the service platform comprises a Session Initiation Protocol (SIP) Application Server (AS).

13. A convergence server, comprising:
first and second network interfaces, which are respectively arranged to communicate with a circuit-switched network and a packet-switched network, wherein the convergence server connects the circuit-switched network and the packet-switched network; and
wherein the convergence server is executing on a processor, and is configured to
accept a request from a calling terminal to provide a particular call service by a service platform in the packet-switched network to a call in the circuit-switched network, wherein one or more call services are provided over both the circuit-switched network and the packet switched network using the service platform,
for each service defined for the call, receive a trigger which comprises a service identifier (service ID) indicating the type of service to be provided,
select a service delivery mode from a plurality of predefined service delivery modes, at the convergence server, having different respective signaling and media path configurations in the circuit-switched and packet-switched networks based on the service ID,
establish signaling and media paths for the call via the circuit-switched and packet-switched networks in accordance with the respective signaling and media path configurations of the selected service delivery mode, wherein in an
intelligent network (IN) mode the convergence server invokes an SIP application server to provide each service defined in the call and establishes a media path between the calling terminal and a called terminal in the circuit-switched network,
IP multimedia subsystem (IMS)-controlled mode the convergence server establishes an initial media path connecting the calling terminal to the SIP application server and then establishes a subsequent media path between the calling terminal and the called terminal using a media gateway (MGW), and
early media mode the convergence server establishes an initial media path connecting the calling terminal to the SIP application server via the media gateway and then establishes a subsequent media path between the calling terminal and a called terminal in the circuit-switched network, and
invoke the service platform to provide the services defined for the call to the call using the established signaling and media paths.

14. The convergence server according to claim 13, wherein the processor is arranged to match the selected mode to a need of the service platform to access a media content of the call in order to provide the particular call service.

15. The convergence server according to claim 13, wherein the plurality of service delivery modes comprises the intelligent network (IN) mode having a media path configuration confined to the circuit-switched network, and wherein the processor is arranged to select the IN mode when providing the particular call service by the service platform does not depend on a media content of the call.

16. The convergence server according to claim 13, wherein the plurality of service delivery modes comprises the early media mode having a first media path configuration connected to the service platform via the packet-switched network and a second media path configuration confined to the circuit-switched network, and wherein selecting the service delivery mode comprises selecting the early media mode when providing the particular call service by the service platform depends on a media content of the call only in an initial stage of the call.

17. The convergence server according to claim 16, wherein the processor is arranged to establish the first media path configuration in the initial stage of the call and to switch to the second media path configuration responsively to a request by the service platform.

18. The convergence server according to claim 13, wherein the plurality of service delivery modes comprises the IP Multimedia Subsystem (IMS)-controlled mode having a first media path configuration anchored at a media gateway (MGW) in the packet-switched network and a second media path configuration further extending the first media path configuration by connecting the MGW and the service platform, and wherein the processor is arranged to switch from the first media path configuration to the second media path configuration so as to provide a media content of the call to the service platform.

19. The convergence server according to claim 18, wherein the processor is arranged to alternate between the first and second media path configurations responsively to a request by the service platform.

20. The convergence server according to claim 13, wherein the processor is arranged to identify the particular call service to be provided to the call by downloading a list of triggers from a service database.

21. The convergence server according to claim 13, wherein the service delivery mode can further be selected based on at least one of an identity of the terminal originating the call and an identity of a subscriber accepting the call.

22. The convergence server according to claim 13, wherein the first network interface is arranged to communicate with an intelligent network (IN), wherein the second network interface is arranged to communicate with an Internet protocol Multimedia Subsystem (IMS) network, and wherein the service platform comprises a Session Initiation Protocol (SIP) Application Server (AS).

23. A communication system, comprising:
a circuit-switched network;
a packet-switched network comprising a service platform, which is configured to provide one or more call services over both the circuit-switched network and the packet switched network; and
a convergence server connected to the circuit-switched and packet-switched networks, which is configured to
accept a request from a calling terminal to provide a particular call service by the service platform to a call in the circuit-switched network,
for each service defined for the call, receive a trigger which comprises a service identifier (service ID) indicating the type of service to be provided,
select a service delivery mode from a plurality of pre-defined service delivery modes, at the convergence server, having different respective signaling and media path configurations in the circuit-switched and packet-switched networks based on the service ID,
establish signaling and media paths for the call via the circuit-switched and packet-switched networks in accordance with the respective signaling and media path configurations of the selected service delivery mode, wherein in an
intelligent network (IN) mode the convergence server invokes an SIP application server to provide each service defined in the call and establishes a media path between the calling terminal and a called terminal in the circuit-switched network,
IP multimedia subsystem (IMS)-controlled mode the convergence server establishes an initial media path connecting the calling terminal to the SIP application server and then establishes a subsequent media path between the calling terminal and the called terminal using a media gateway (MGW), and
early media mode the convergence server establishes an initial media path connecting the calling terminal to the SIP application server via the media gateway and then establishes a subsequent media path between the calling terminal and a called terminal in the circuit-switched network, and
invoke the service platform to provide the services defined for the call to the call using the established signaling and media paths.

24. The system according to claim 23, wherein the circuit-switched network comprises an intelligent network (IN), wherein the packet-switched network comprises an Internet protocol Multimedia Subsystem (IMS) network, and wherein the service platform comprises a Session Initiation Protocol (SIP) Application Server (AS).

25. A computer software product for communication in a communication system that includes a circuit-switched network and a packet-switched network, the product comprising a non-transitory computer-readable storage medium, in which program instructions are stored, which instructions, when read by a computer, cause the computer to:
provide a convergence server which connects the circuit-switched and the packet-switched networks;
deploy one or more call services over both the circuit-switched network and the packet switched network using a service platform;
accept a request from a calling terminal to provide a call service by a service platform in the packet-switched network to a call in the circuit-switched network;
for each service defined for the call, receive a trigger which comprises a service identifier (service ID) indicating the type of service to be provided,
select a service delivery mode from a plurality of pre-defined service delivery modes, at the convergence server, having different respective signaling and media path configurations in the circuit-switched and packet-switched networks based on the service ID;
establish signaling and media paths for the call via the circuit-switched and packet-switched networks in accordance with the respective signaling and media path configurations of the selected service delivery mode, wherein in an
intelligent network (IN) mode the convergence server invokes an SIP application server to provide each service defined in the call and establishes a media path between the calling terminal and a called terminal in the circuit-switched network,
IP multimedia subsystem (IMS)-controlled mode the convergence server establishes an initial media path connecting the calling terminal to the SIP application server and then establishes a subsequent media path between the calling terminal and the called terminal using a media gateway (MGW), and
early media mode the convergence server establishes an initial media path connecting the calling terminal to the SIP application server via the media gateway and then establishes a subsequent media path between the calling terminal and a called terminal in the circuit-switched network; and
invoke the service platform to provide the services defined for the call to the call using the established signaling and media paths.

* * * * *